United States Patent
Talley et al.

(10) Patent No.: US 7,852,810 B1
(45) Date of Patent: Dec. 14, 2010

(54) DYNAMIC ADJUSTMENT OF FORWARD-LINK FRAME-ERROR-RATE (FFER) TARGET

(75) Inventors: Ryan S. Talley, Overland Park, KS (US); Andrew M. Wurtenberger, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 458 days.

(21) Appl. No.: 11/619,348

(22) Filed: Jan. 3, 2007

(51) Int. Cl.
*H04W 4/00* (2009.01)
(52) U.S. Cl. .................. 370/333; 714/704; 714/705
(58) Field of Classification Search .......... 455/67.1, 455/67.4; 370/333, 332, 320; 714/704, 705, 714/764, 765, 788, 709, 746, 754, 798, 799
See application file for complete search history.

(56) References Cited

U.S. PATENT DOCUMENTS

| | | | |
|---|---|---|---|
| 5,475,861 A | 12/1995 | Hall | |
| 5,914,950 A | 6/1999 | Tiedemann, Jr. et al. | |
| 6,154,638 A * | 11/2000 | Cheng et al. | 455/67.11 |
| 6,397,043 B1 * | 5/2002 | Kang | 455/69 |
| 6,597,923 B1 * | 7/2003 | Vanghi et al. | 455/522 |
| 6,671,512 B2 | 12/2003 | Laakso | |
| 6,944,449 B1 | 9/2005 | Gandhi et al. | |
| 7,054,275 B2 | 5/2006 | Kim et al. | |
| 7,072,630 B2 | 7/2006 | Lott et al. | |
| 7,194,281 B2 | 3/2007 | Peng et al. | |
| 7,215,653 B2 | 5/2007 | Kim et al. | |
| 7,280,510 B2 | 10/2007 | Lohtia et al. | |
| 7,280,511 B2 | 10/2007 | Ahn | |
| 7,392,055 B2 | 6/2008 | Li et al. | |
| 7,403,800 B2 | 7/2008 | Han et al. | |
| 7,522,919 B2 | 4/2009 | Yoon et al. | |
| 7,609,635 B2 | 10/2009 | Bae et al. | |
| 7,668,561 B2 | 2/2010 | Au et al. | |
| 7,693,032 B2 * | 4/2010 | Li et al. | 370/204 |
| 2001/0019943 A1 | 9/2001 | Bender et al. | |
| 2002/0094837 A1 | 7/2002 | Hamabe et al. | |
| 2003/0064741 A1 | 4/2003 | Silva et al. | |
| 2003/0134656 A1 | 7/2003 | Chang et al. | |
| 2003/0143190 A1 * | 7/2003 | Iyer et al. | 424/85.1 |
| 2003/0153272 A1 | 8/2003 | Takano | |
| 2004/0047305 A1 * | 3/2004 | Ulupinar | 370/320 |

(Continued)

FOREIGN PATENT DOCUMENTS

KR 20040099837 12/2004

OTHER PUBLICATIONS

Non-final Office Action from U.S. Appl. No. 11/558,337, mailed Dec. 16, 2009.

(Continued)

*Primary Examiner*—Kent Chang
*Assistant Examiner*—San Htun

(57) ABSTRACT

Methods and systems are provided for dynamic adjustment of the forward-link frame error rate (FFER) target. In accordance with an exemplary embodiment, a base station provides service to at least one mobile station on a carrier in a wireless coverage area using a first FFER target. The base station calculates an $E_c/I_{or}$ value for the carrier in the wireless coverage area. The base station then selects a second FFER target based at least in part on the calculated $E_c/I_{or}$ value. Thereafter, the base station provides service to at least one mobile station on the carrier in the wireless coverage area using the second FFER target.

17 Claims, 4 Drawing Sheets

U.S. PATENT DOCUMENTS

| | | | |
|---|---|---|---|
| 2004/0146016 A1 | 7/2004 | Kim et al. | |
| 2004/0176042 A1 | 9/2004 | Lott et al. | |
| 2004/0193971 A1* | 9/2004 | Soong et al. | 714/704 |
| 2004/0213182 A1 | 10/2004 | Huh et al. | |
| 2004/0241803 A1* | 12/2004 | Rosen et al. | 435/69.1 |
| 2005/0041612 A1 | 2/2005 | Zhang et al. | |
| 2005/0107107 A1 | 5/2005 | Shahidi | |
| 2005/0201332 A1* | 9/2005 | Bakshi et al. | 370/333 |
| 2005/0288053 A1 | 12/2005 | Gu | |
| 2006/0045045 A1 | 3/2006 | Blessent et al. | |
| 2006/0223444 A1 | 10/2006 | Gross et al. | |
| 2006/0223565 A1* | 10/2006 | Gandhi et al. | 455/522 |
| 2006/0234638 A1 | 10/2006 | Mueckenheim et al. | |
| 2006/0275782 A1* | 12/2006 | Gunderson et al. | 435/6 |
| 2007/0026884 A1 | 2/2007 | Rao | |
| 2007/0129086 A1 | 6/2007 | Toone | |
| 2007/0155395 A1 | 7/2007 | Gopalakrishnan et al. | |
| 2007/0191044 A1* | 8/2007 | Kostic et al. | 455/522 |
| 2007/0270100 A1 | 11/2007 | Agrawal et al. | |
| 2008/0084841 A1 | 4/2008 | Kim et al. | |

OTHER PUBLICATIONS

Unpublished U.S. Appl. No. 12/026,236, entitled "Dynamic Adjustment of Target Frame Error Rate," filed Feb. 5, 2008 in the name of Manghat et al.

Non-final Office Action from U.S. Appl. No. 11/558,337, mailed May 29, 2009.

Non-final Office Action from U.S. Appl. No. 10/910,835, mailed Nov. 19, 2007.

Final Office Action from U.S. Appl. No. 10/910,835, mailed Jun. 13, 2008.

Advisory Action from U.S. Appl. No. 10/910,835, mailed Aug. 19, 2008.

Hye Jeong Lee, "New Rate Control Scheme Based on Adaptive rateLimit for 1xEV-DO Reverse Link Traffic Channels Communications Letters," vol. 9, No. 10, Oct. 2005.

Woo Young Yeo, "An Analytical Model for Reverse Link Rate Control in cdma2000 1xEV-DO Systems," IEEE Communications Letters, vol. 9, No. 3, Mar. 2005.

Esa Tiirola, "Performance of a UMTS Uplink MIMO Scheme," IEEEplore 2003.

Ridha Nasri, "Achieving a high uplink capacity and coverage by using multicariers in 3G-WCDMA Systems," 2004 IEEE.

Unpublished U.S. Appl. No. 10/910,835, entitled "Dynamic Power Rail Configuration in a Wireless CDMA Communication System," filed Aug. 4, 2004 in the name of Ribas et al.

Unpublished U.S. Appl. No. 11/558,337, entitled "Dynamic Adjustment of EV-DO Reverse-Link Transitional Probabilities," filed Nov. 9, 2006 in the name of inventor Andrew M. Wurtenberger et al.

Unpublished U.S. Appl. No. 11/762,534, entitled "Dynamic Adjustment of Reverse-Link Frame-Error-Rate (RFER) Target Based on Reverse-Link RF Conditions," filed Jun. 13, 2007 in the name of inventor Ryan S. Talley et al.

Unpublished U.S. Appl. No. 12/179,744, entitled "Conducting Power Control Based on Reverse-Link RF Conditions," filed Jul. 25, 2008 in the name of inventor Manoj Shetty et al.

Non-final Office Action from U.S. Appl. No. 11/762,534, mailed Feb. 4, 2010.

Unpublished U.S. Appl. No. 12/763,203, filed Apr. 19, 2010 in the name of Goyal et al., entitled "Selectively Conducting Reverse-Link Power Control and Call Admission Control."

Unpublished U.S. Appl. No. 12/763,206, filed Apr. 19, 2010 in the name of Khanka et al., entitled "Identifying and Selectively Controlling Reverse-Noise Contribution on a Per-Access-Terminal Basis."

Final Office Action from U.S. Appl. No. 11/558,337, mailed Jun. 1, 2010.

Notice of Allowance from U.S. Appl. No. 11/762,534, mailed Jun. 3, 2010.

* cited by examiner

| Ec/Ior | FFER TARGET |
|---|---|
| LOW RANGE | FFER_TARGET_1 |
| MODERATE RANGE | FFER_TARGET_2 |
| HIGH RANGE | FFER_TARGET_3 |

CORRELATION DATA 200

FIG. 2

DYNAMIC ADJUSTMENT OF FORWARD-LINK FRAME-ERROR-RATE (FFER) TARGET

BACKGROUND

1. Technical Field

The present invention relates to wireless networks, and, more particularly, to managing transmission power between base stations and mobile stations.

2. Description of Related Art a. CDMA Networks Generally

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data communication.

Typical CDMA networks include a plurality of base stations, each of which provide one or more wireless coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access. The base station and the mobile station conduct these communications over a frequency known as a carrier, which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

Furthermore, using a sector as an example of a wireless coverage area, base stations may provide service in a given sector on one carrier, or on more than one. An instance of a particular carrier in a particular sector is referred to herein as a sector/carrier. In a typical CDMA system, using a configuration known as radio configuration 3 (RC3), a base station can, on a given sector/carrier, transmit forward-link data on a maximum of 64 distinct channels at any given time, each channel corresponding to a unique 64-bit code known as a Walsh code. Of these channels, typically, 61 of them are available as traffic channels (for user data), while the other 3 are reserved for administrative channels known as the pilot, paging, and sync channels.

When a base station instructs a mobile station—operating on a particular sector/carrier—to use a particular traffic channel for a communication session, such as a voice call or a data session, the base station does so by instructing the mobile station to tune to a particular one of the 61 Walsh-coded traffic channels on that sector/carrier. It is over that assigned traffic channel that the base station will transmit forward-link data to the mobile station during the ensuing communication session. And, in addition to that Walsh-coded forward-link channel, the traffic channel also includes a corresponding Walsh-coded reverse-link channel, over which the mobile station transmits data to the base station.

b. Forward-Link Transmission-Power Management i. Forward-Link Frame Error Rate (FFER)

In typical CDMA systems, communication between a base station and a mobile station involves (i) the base station sending data units known as frames to the mobile station on the forward link and (ii) the mobile station sending frames to the base station on the reverse link. These frames may carry administrative messages, voice data, SMS messages, packet data, and/or any other type of data. Focusing on the forward link, some of the frames received by the mobile station contain errors as a result of imperfect transfer, while some do not. Thus, a ratio can be computed between (i) the number of error-containing frames received by the mobile station over a given time period and (ii) the total number of frames received by the mobile station over that same time period. This ratio is known as the forward-link frame error rate (FFER). Note that the FFER calculations may also account for frames that are not received at all by the mobile station.

And other things being more or less equal, the more power the base station allocates for transmission to the mobile station on a traffic channel, the lower the mobile station's FFER will be. The mobile station periodically (e.g. once every 100 or 200 frames) computes its FFER, and reports it to the base station. The base station then adjusts its transmission power accordingly for that traffic channel. If the FFER is too high with respect to what is deemed to be an acceptable threshold, the base station increases transmission power in an effort to reduce the FFER. If the FFER is below the threshold, the base station may allocate less power to that mobile station, to have more available for other mobile stations. This back-and-forth calibration is conducted in an attempt to keep the mobile station's FFER at or just below the acceptable threshold, referred to herein as the "FFER target," which may be configured to be in the neighborhood of 2%.

Note that different situations may present themselves on a sector/carrier at different times. For example, the number of mobile stations using traffic channels can vary between just a few, such as 5 or 10, to a large number, such as 25, 30, or more. Also, variables such as terrain, weather, buildings, other mobile stations, other types of interference, and a mobile station's distance from the base station can affect the FFER that a mobile station experiences and reports, and therefore, in turn, affect the amount of power that the base station allocates for transmitting forward-link data to the mobile station. Since base stations have only a finite total amount of power that they can allocate to the mobile stations on a sector/carrier, increasing the transmission power to some or all of those mobile stations (in order to keep their respective FFERs acceptably low) generally results in the base station being able to serve fewer mobile stations on that sector/carrier. That is, it reduces capacity on the sector/carrier.

ii. The Logarithmic Ratio $E_c/I_{or}$

As explained, in typical CDMA systems, each base station can allocate a certain amount of power to transmitting on each sector/carrier on which it is providing service. The base station divides this power among any active traffic channels (over which the base station is transmitting data, such as voice and/or packet data, to mobile stations operating on that sector/carrier), as well as among the pilot, paging, and sync channels for the sector/carrier. Periodically, the base station calculates a ratio of (a) the power that the base station is allocating for transmitting the pilot channel on the sector/carrier (the "pilot-channel power level") with (b) the power that the base station is allocating for transmitting all (i.e. pilot, paging, sync, and traffic) channels on the sector/carrier (the "all-channel power level").

This ratio is a base-10 logarithmic one, and is known as "$E_c/I_{or}$." The pilot-channel power level is referred to as "$E_c$"—"energy per chip." The all-channel power level is referred to as "$I_{or}$". $E_c$ and $I_{or}$ can each be expressed in Watts (W), milliwatts (mW), or any other suitable units of measure. Note that $E_c$ and $I_{or}$ are themselves often expressed as base-10 logarithmic ratios, with respect to a reference power level of 1 mW. In that case, $E_c$ and $I_{or}$ would each typically be expressed using the unit "dBm," where "dB" indicates decibels and "m" indicates the reference power level. So, $E_c$ can be expressed as the base-10 logarithmic ratio of the pilot-channel power level (in mW) and 1 mW. And $I_{or}$ can be expressed as the base-10 logarithmic ratio of the all-channel power level (in mW) and 1 mW.

$E_c/I_{or}$ is typically expressed as the base-10 logarithmic ratio of the pilot-channel power level and the all-channel power level, each of which may be measured in Watts. As such, the typical unit of measure for $E_c/I_{or}$ is the decibel (dB). As an example, if a base station were allocating about 2 W (2000 mW) for the pilot channel, $E_c$ would be about 33 dBm, calculated as 10*log((2000 mW)/(1 mW)). And if the base station were allocating a total of about 10 W (10,000 mW) for the pilot, paging, sync, and active traffic channels, $I_{or}$ would be about 40 dBm, calculated as 10*log((10000 mW)/(1 mW)). In this example, $E_c/I_{or}$ would be about −7 dB, calculated as 10*log((2 W)/(10 W)). Note that $E_c/I_{or}$ will always be negative, as long as at least some power is allocated for any one or any combination of the paging, sync, and traffic channels.

As another example, a typical base station may have 16 W of power that it can potentially use for transmitting all channels on a sector/carrier, and may allocate 15% (2.4 W) of that for the pilot channel, 10% (1.6 W) for the paging channel, and 5% (0.8 W) for the sync channel. When that base station is not serving any mobile stations on active traffic channels on the sector/carrier, i.e. when the sector/carrier is "unloaded," $E_c/I_{or}$ would be approximately −3 dB, calculated as 10*log (2.4W/4.8W), which, then, would be about as high as $E_c/I_{or}$ gets. Thus, for reference, anything close to −3 dB may be considered relatively high for $E_c/I_{or}$.

And when that same base station is at or near capacity ("fully loaded"), the 15% of its potential sector/carrier power that it is allocating for the pilot channel would shrink from being half of its power output on the sector/carrier (in the unloaded scenario) to, not surprisingly, being about 15% of its power output. This would yield an $E_c/I_{or}$ of approximately −8 dB, calculated as 10*log(2.4W/16W), which, then would be about as low as $E_c/I_{or}$ gets. Thus, for reference, anything close to −8 dB may be considered relatively low for $E_c/I_{or}$. In fact, a typical base station may stop accepting new mobile stations on a sector/carrier once $E_c/I_{or}$ degrades to about −8 dB. Thus, $E_c/I_{or}$ can impact sector/carrier capacity as well.

When $E_c/I_{or}$ is relatively high, this could mean a number of things. For example, there could be only a few mobile stations on the sector/carrier, which would lead to a higher ratio of (i) pilot-channel power allocation to (ii) total power allocation (with relatively few traffic channels to which to allocate power). Instead or in addition, it could mean that the RF conditions are favorable, such that no (or relatively few) mobile stations are experiencing a poor FFER. In that situation, there would be no (or relatively few) mobile stations inducing the base station to increase power on the traffic channels. This would tend to keep the value of $E_c/I_{or}$ relatively high. And other possibilities exist as well.

When $E_c/I_{or}$ is relatively low, this also could mean a number of things. For example, there could be a relatively high number of mobile stations on the sector/carrier, and thus a high number of active traffic channels contributing to a high value of $I_{or}$, and thus a low value of $E_c/I_{or}$. Instead or in addition, it could mean that the RF conditions are poor (e.g., due to terrain, weather, interference, etc.); in that case, mobile stations would likely experience a poor FFER, and induce the base station to increase power on the traffic channels, which would contribute to a higher $I_{or}$ and thus a lower $E_c/I_{or}$. And other possibilities exist as well.

SUMMARY

Methods and systems are provided for dynamic adjustment of the FFER target. In one aspect, an exemplary embodiment may take the form of a method. In accordance with the method, a base station provides service to at least one mobile station on a carrier in a wireless coverage area using a first FFER target. The base station calculates an $E_c/I_{or}$ value for the carrier in the wireless coverage area. The base station then selects a second FFER target based at least in part on the calculated $E_c/I_{or}$ value. Thereafter, the base station provides service to at least one mobile station on the carrier in the wireless coverage area using the second FFER target.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 2 is a simplified block diagram of an example of correlation data, in accordance with exemplary embodiments;

DETAILED DESCRIPTION OF EXEMPLARY EMBODIMENTS

1. Overview

Figure 1:
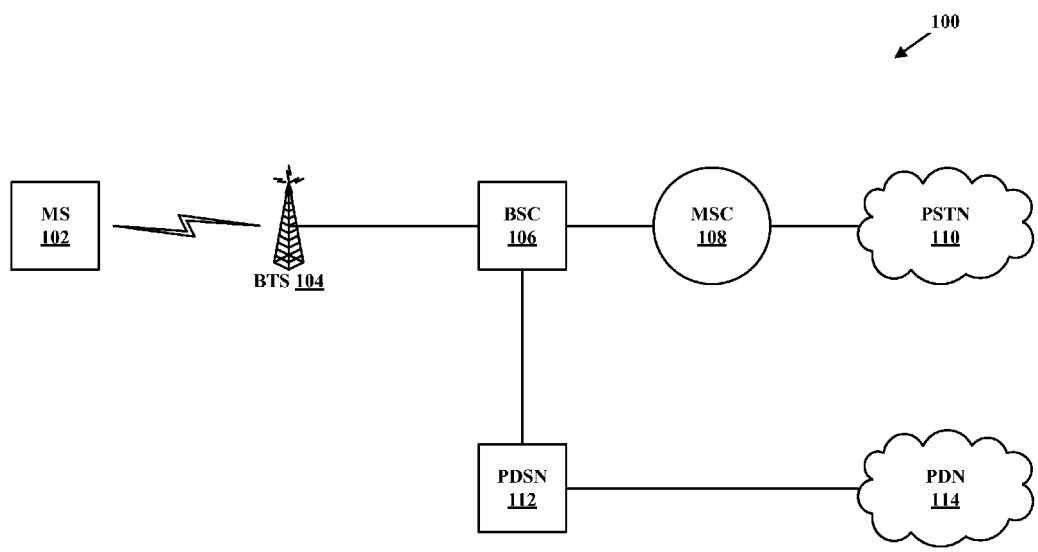
FIG. 1 is a simplified block diagram of a communication system, in accordance with exemplary embodiments.

As presently contemplated, in exemplary embodiments, a base station will, on a given sector/carrier, dynamically adjust the FFER target in response to periodic calculations of $E_c/I_{or}$. Thus, if the base station determines that the sector/carrier has a relatively low $E_c/I_{or}$, the base station will increase (i.e. relax) the FFER target for that sector/carrier. This will tend to result in the base station decreasing transmission power to mobile stations on the sector/carrier. That, in turn, will tend to result in the sector/carrier having more capacity, albeit perhaps at a lesser quality of service. If, however, the base station determines that the sector/carrier has a relatively high $E_c/I_{or}$, the base station will decrease (i.e. make more strict) the FFER target. This will tend to result in the base station increasing transmission power to mobile stations on the sector/carrier. That, in turn, will tend to result in the base station providing a higher quality of service on the sector/carrier, albeit perhaps at a lower capacity.

As explained, a relatively high $E_c/I_{or}$ may correspond to a sector/carrier being lightly loaded with mobile stations, while a relatively low $E_c/I_{or}$ may correspond to a sector/carrier being heavily loaded with mobile stations. Thus, one way to characterize the present invention is that the FFER target is being made dynamically responsive to loading conditions. And metrics of sector/carrier load other than $E_c/I_{or}$ can be used—alone or in combination with $E_c/I_{or}$ or each other—to dynamically change the FFER target for the sector/carrier. Some load-metric candidates include Walsh-code occupancy and paging-channel-timeslot occupancy, which are explained herein, any other load metrics, and any combination of these. Using $E_c/I_{or}$ is preferred, however, since both it and FFER are related to forward-link transmission power.

As also explained, a relatively high $E_c/I_{or}$ could correspond to favorable RF conditions on a sector/carrier, while a relatively low $E_c/I_{or}$ could correspond to unfavorable RF conditions. As such, another way to characterize the present invention is that the FFER target is being made dynamically responsive to RF conditions. And the loading-conditions and RF-conditions views are not mutually exclusive. That is, $E_c/I_{or}$ generally reflects some of each, and each can certainly contribute to situations where it would be advantageous to adjust the FFER target.

In some embodiments, a threshold value of $E_c/I_{or}$ may be used to dynamically adjust the FFER target. If the base station determines that $E_c/I_{or}$ is below the threshold, the base station may increase (relax) the FFER target for the sector/carrier, such that the base station will likely then reduce its transmission power on the sector/carrier, bringing $E_c/I_{or}$ back up. If, on the other hand, the base station determines that $E_c/I_{or}$ is at or above the threshold, the base station may decrease (make more strict) the FFER target for the sector/carrier, such that the base station will likely then increase its transmission power on the sector/carrier, which will provide a higher quality of service, but may reduce capacity and eventually push $E_c/I_{or}$ back down.

In other embodiments, more than two ranges—or more than one threshold value—of $E_c/I_{or}$ may be used. For example, the base station may maintain a table of $E_c/I_{or}$ ranges correlated with various values for the FFER target. Upon calculating $E_c/I_{or}$ on the sector/carrier, the base station may determine into which range the calculated value falls, and set the FFER target for the sector/carrier equal to the FFER-target value corresponding to that range. In other embodiments, two $E_c/I_{or}$ thresholds may be used: if $E_c/I_{or}$ is above the greater of the two thresholds, the base station may decrease the FFER target; if $E_c/I_{or}$ is lower than the lesser of the two thresholds, the base station may increase the FFER target; if $E_c/I_{or}$ is between the thresholds, the base station may leave the FFER target unmodified. And other examples are possible.

Furthermore, it may be taken into consideration how frequently it would be advisable to change the FFER target for a given sector/carrier. Generally stated, the base station should change the FFER target often enough to be dynamically responsive to $E_c/I_{or}$ conditions on the sector/carrier, but not so often so as to inefficiently consume resources such as processing power, memory, battery power, time, and/or other resources of the base station and/or the mobile stations. For example, in a situation where $E_c/I_{or}$ is hovering near a threshold value or boundary between $E_c/I_{or}$ ranges, the base station could guard against switching the FFER target every time $E_c/I_{or}$ crosses the threshold or boundary value.

Thus, the base station could have a limit as to how often it would change the FFER target, such as once every 10 seconds, 30 seconds, minute, etc. If one of those time periods—or some other time period—were used as the interval, then the base station could, once per interval, base its decision on the most recent measurement of $E_c/I_{or}$, a measurement near the halfway point of such an interval, an average of several samples taken over the interval, or perhaps an average of all measurements taken over the interval. And other possibilities exist as well, without deviating from the scope and spirit of the present invention.

Moreover, while embodiments of the invention are described herein for the most part with respect to a single base station and, more particularly, with respect to a single sector/carrier, this mode of explanation is for clarity and not by way of limitation. Thus, the present invention could be implemented in all or any subset of the base stations of a given wireless network, and in all or any subset of the sectors and carriers of a given wireless network as well.

The present invention, then, makes the FFER target dynamically responsive to loading and RF conditions on a sector/carrier. Preferably, the FFER target is dynamically responsive to periodic calculations of $E_c/I_{or}$. Among other advantages, the invention improves service quality at the expense of capacity in situations where capacity is less of a concern, and improves capacity at the expense of service quality in situations where capacity is more of a concern.

2. Exemplary Architecture a. Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a base transceiver station (BTS) 104, a base station controller (BSC) 106, a mobile switching center (MSC) 108, a public switched telephone network (PSTN) 110, a packet data serving node (PDSN) 112, and a packet-data network (PDN) 114. And additional entities could be present as well. For example, there could be additional mobile stations in communication with BTS 104; furthermore, there could be additional entities in communication with PSTN 110 and/or PDN 114. Also, there could be one or more devices and/or networks making up at least part of one or more of the communication links. For example, there could be one or more routers, switches, or other devices or networks on the link between PDSN 112 and PDN 114.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may comprise an antenna and a chipset for communicating with one or more base stations over an air interface. As an example, the chipset could be one that is suitable for CDMA communication. The chipset or wireless-communication interface in general may also be able to communicate with other types of networks and devices, such as IS-856 Evolution Data Optimized (EV-DO) networks, Wi-Fi (IEEE 802.11) networks, Bluetooth devices, and/or one or more additional types of wireless networks. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

BTS 104 may be any network element arranged to carry out the BTS functions described herein. As such, BTS 104 may include a communication interface, a processor, and data storage comprising instructions executable by the processor to carry out those BTS functions. The communication interface may include one or more antennas, chipsets, and/or other components for providing one or more CDMA coverage areas such as cells and sectors, for communicating with mobile stations, such as mobile station 102, over an air interface. The communication interface may also include one or more wired and/or wireless interfaces for communicating with at least BSC 106. As an example, a wired Ethernet interface may be included.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least BTS 104, MSC 108, and PDSN 112. In general, BSC 106 functions to control one or more BTSs such as BTS 104, and to provide one or more BTSs such as BTS 104 with connections to devices such as MSC 108 and PDSN 112.

Note that the combination of BTS 104 and BSC 106 may be considered a base station. However, BTS 104 or BSC 106 could, taken alone, be considered a base station as well. Furthermore, a base station may be considered to be either or both of those devices, and perhaps make use of one or more functions provided by MSC 108, PDSN 112, and/or any other entity, without departing from the scope or spirit of the present invention.

Referring to BTS 104 as a base station for illustration, BTS 104 may maintain one or more sets of data for use in carrying out exemplary embodiments. FIG. 2 depicts one possible set of such data. In particular, FIG. 2 depicts correlation data 200, which generally (i.e. in each row of the table) correlates ranges of $E_c/I_{or}$ values with FFER-target values. Thus, a low range of $E_c/I_{or}$ is correlated with a FFER_TARGET_1, a moderate range of $E_c/I_{or}$ is correlated with a FFER_TARGET_2, and a high range of $E_c/I_{or}$ is correlated with a FFER_TARGET_3.

Note that, while three $E_c/I_{or}$ ranges and associated FFER-target values are depicted in FIG. 2, any number of correlations could be used. Furthermore, these ranges and FFER targets could take on any values deemed suitable for a particular implementation. As one example, the low range could be $E_c/I_{or}$ values that are less than −7 dB, the moderate range could be $E_c/I_{or}$ values between −7 dB and −5 dB, and the high range could be $E_c/I_{or}$ values greater than −5 dB. Further to this example, FFER_TARGET_1 could be 3%, FFER_TARGET_2 could be 2%, and FFER_TARGET_3 could be 1%. And many other examples are possible as well.

Returning to FIG. 1, MSC 108 may be any networking element arranged to carry out the MSC functions described herein. As such, MSC 108 may include a communication interface, a processor, and data storage comprising instructions executable by the processor to carry out those MSC functions. The communication interface may include one or more wired and/or wireless interfaces for communicating with at least BSC 106 and PSTN 110. In general, MSC 108 functions as a switching element between PSTN 110 and one or more BSCs such as BSC 106, facilitating communication between mobile stations and PSTN 110, which may be the well-known public switched telephone network.

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and PDN 114. In general, PDSN 112 functions as a network access server between PDN 114 and BSCs such as BSC 106, facilitating packet-data communication between mobile stations and PDN 114.

PDN 114 may include one or more wide area networks, one or more local area networks, one or more public networks such as the Internet, one or more private networks, one or more wired networks, one or more wireless networks, and/or one or more networks of any other type. Devices in communication with PDN 114 may exchange data using a packet-switched protocol such as the Internet Protocol (IP), and may be identified by an address such as an IP address.

3. Exemplary Operation a. A First Exemplary Method

Figure 3:
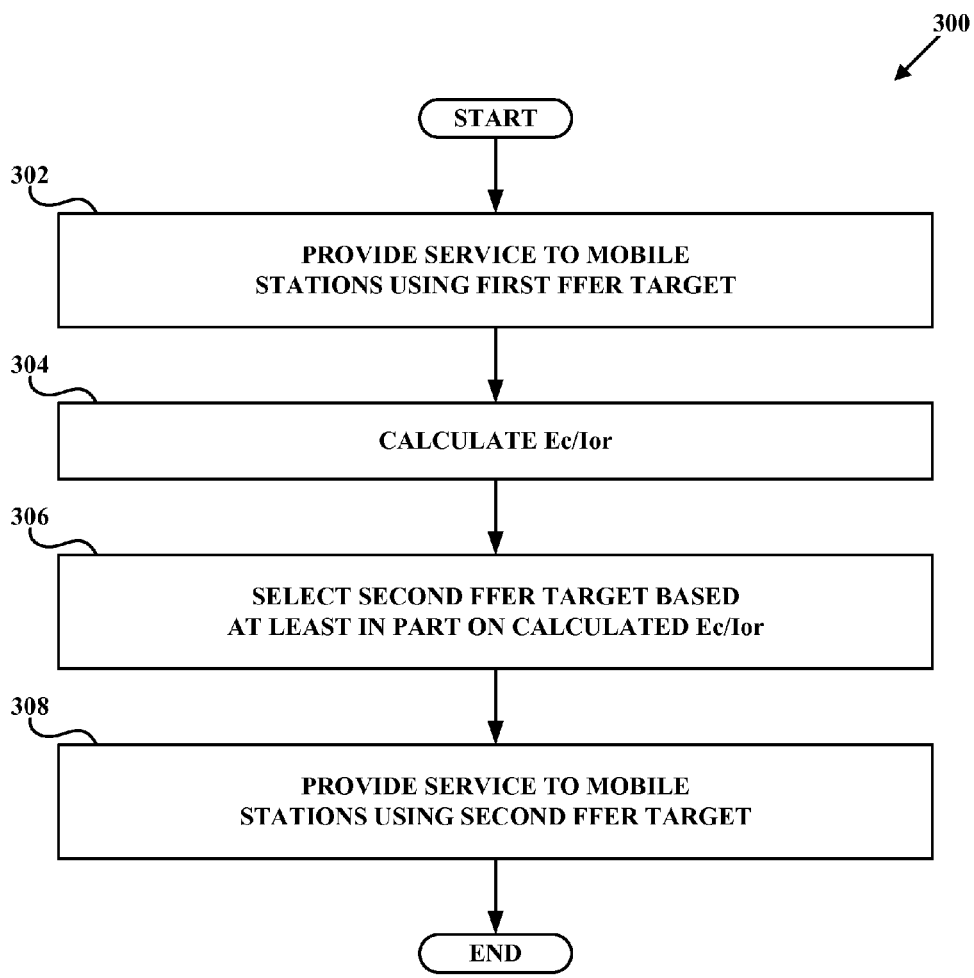
FIG. 3 is a flowchart of a method, in accordance with exemplary embodiments.

FIG. 3 depicts a flowchart of an exemplary method, in accordance with an exemplary embodiment. As shown in FIG. 3, method 300 begins at step 302, when BTS 104 provides service to at least one mobile station, perhaps including mobile station 102, on a carrier in a wireless coverage area using a first FFER target. At step 304, BTS 104 calculates an $E_c/I_{or}$ value for the carrier in the wireless coverage area. At step 306, BTS 104 selects a second FFER target based at least in part on the calculated $E_c/I_{or}$. At step 308, BTS 104 provides service to at least one mobile station on the carrier in the wireless coverage area using the second FFER target.

These steps are explained in the following subsections. And it should be noted that, although method 300 is described as being carried out by BTS 104, this is not required. In some embodiments, method 300 may be carried out by BSC 106, or perhaps by a combination of BTS 104 and BSC 106. In general, method 300 could be carried out by any one or any combination of the network elements described herein, or any other network element(s).

i. Provide Service to Mobile Stations Using First FFER Target

At step 302, BTS 104 provides service to mobile station 102 on a carrier in a wireless coverage area using a first FFER target. Note that, typically, BTS 104 will provide service to multiple mobile stations, perhaps on multiple carriers, in the given wireless coverage area (and, for that matter, in multiple coverage areas), and that mobile station 102 would simply be an exemplary one of these mobile stations. Furthermore, the service provided by BTS 104 may be or include CDMA service, perhaps in conformance with one or more well-known industry standards such as IS-95 and IS-2000, both of which are incorporated by reference herein.

And the coverage area could be a cell or sector. For the balance of the description of method 300, for purposes of illustration only, one exemplary carrier in one exemplary sector will be described, and referred to, as above, as a sector/ carrier. Furthermore, as an example, the first FFER target could be 2%, though other values could be used. And, in general, providing service to at least one mobile station on the carrier in the wireless coverage area using a given FFER target may involve receiving indications from mobile stations that they are experiencing various FFERs, and comparing those FFERs with the given FFER target.

If a given mobile station is experiencing a FFER that is higher than the given FFER target, BTS 104 will typically increase transmission power to that mobile station, in an effort to bring its FFER back down to an acceptable level. In some implementations, if the given mobile station is experiencing a FFER that is lower than the given FFER target, BTS 104 will decrease transmission power to that mobile station, which will tend to allow that mobile station's FFER to go back up, but will allow BTS 104 to, at least temporarily, allocate the saved transmission power to other mobile stations that may need it.

ii. Calculate $E_c/I_{or}$

At step 304, BTS 104 calculates an $E_c/I_{or}$ value for the sector/carrier. Thus, BTS 104 may determine that it is allocating a certain amount of power to transmitting the pilot channel on the sector/carrier (again, the "pilot-channel power"), and a certain amount of power to transmitting all channels (i.e., the pilot, paging, sync, and traffic channels) on the sector/carrier (again, the "all-channel power"). As explained, BTS 104 may calculate $E_c/I_{or}$ as the base-10 logarithmic ratio of the pilot-channel power and the all-channel power. As was also explained, $E_c/I_{or}$ may be measured in dB. Note that the $E_c/I_{or}$ calculated in this step could be a snapshot value, calculated at a given moment, and could also be an average of multiple $E_c/I_{or}$ values calculated during a particular preceding time interval. And other possibilities exist as well.

iii. Select Second FFER Target Based At Least in Part on $E_c/I_{or}$

At step 306, BTS 104 selects a second FFER target based at least in part on the calculated $E_c/I_{or}$ value from step 304. In one embodiment, step 306 may involve BTS 104 comparing the calculated $E_c/I_{or}$ with a threshold value for $E_c/I_{or}$. As one example, the threshold value for $E_c/I_{or}$ could be −6 dB or thereabouts. If the calculated $E_c/I_{or}$ is less than the threshold $E_c/I_{or}$, BTS 104 may select the second FFER target to be greater than the first FFER target. This will tend to decrease forward-link transmission power and allow $E_c/I_{or}$ to rebound. If, on the other hand, the calculated $E_c/I_{or}$ is greater than or equal to the threshold $E_c/I_{or}$, BTS 104 may select the second FFER target to be less than the first FFER target. This will tend to increase transmission power on the forward link, improving service quality, perhaps reducing capacity, and driving the value of $E_c/I_{or}$ back down.

And BTS 104 may have particular increments that it uses in selecting the second FFER target, depending on the comparison of the calculated $E_c/I_{or}$ to the threshold $E_c/I_{or}$. Thus, if the calculated $E_c/I_{or}$ is less than the threshold $E_c/I_{or}$, BTS 104 may select the second FFER target to be 1% greater than the first FFER target. If, on the other hand, the calculated $E_c/I_{or}$ is greater than or equal to the threshold $E_c/I_{or}$, BTS 104 may select the second FFER target to be 1% less than the first FFER target. Thus, if the first FFER target were 2%, the second may end up being either 1% or 3%. And other increments are certainly possible as well. And, obviously, certain limitations may be accounted for as well, such as not going to or below 0%, and perhaps not going above a certain upper bound as well.

In other embodiments, multiple $E_c/I_{or}$ thresholds may be considered. For example, BTS 104 may compare the calculated $E_c/I_{or}$ with both a lower $E_c/I_{or}$ threshold and an upper $E_c/I_{or}$ threshold, where the lower threshold is less than the upper threshold. If the calculated $E_c/I_{or}$ is less than the lower threshold, BTS 104 may select the second FFER target to be greater than the first FFER target. If, however, the calculated $E_c/I_{or}$ is both (i) greater than or equal to the lower threshold and (ii) less than or equal to the upper threshold, then BTS 104 may select the second FFER target to be equal to the first FFER target. That is, BTS 104 may leave the FFER target for the sector/carrier unmodified. Finally, if the calculated $E_c/I_{or}$ is greater than the upper threshold, BTS 104 may select the second FFER target to be less than the first FFER target.

Note that explicit comparison with one of the thresholds could include implicit comparison with the other. That is, for example, a determination that the calculated $E_c/I_{or}$ is less than the lower threshold obviates the need to explicitly compare the calculated $E_c/I_{or}$ with the upper threshold. Again, any FFER-target increments could be used. And, as examples, the lower threshold could be approximately −7 dB, while the upper threshold could be approximately −5 dB, though other values could clearly be used.

In other embodiments, BTS 104 may maintain data that correlates each of multiple $E_c/I_{or}$ ranges with a respective FFER-target value. For example, BTS 104 may maintain (which may encompass storing and/or having access to) data such as correlation data 200 of FIG. 2. BTS 104 may thus determine that the calculated $E_c/I_{or}$ falls within a particular one of the $E_c/I_{or}$ ranges, and responsively select the second FFER target to be equal to whichever FFER-target value is associated with that particular $E_c/I_{or}$ range. As one example, BTS 104 may determine that the calculated $E_c/I_{or}$ falls within the low range, and responsively select FFER_TARGET_1.

iv. Provide Service to Mobile Stations Using Second FFER Target

At step 308, BTS 104 provides service to mobile stations, such as mobile station 102, on the sector/carrier using the second FFER target, which was selected in step 306. As described herein, this may involve receiving reports of the various FFERs that mobile stations such as mobile station 102 are experiencing, comparing those FFERs with the second FFER target, and adjusting forward-link transmission power to each respective mobile station accordingly.

v. Generally

In general, it is contemplated that method 300 will be carried out repeatedly, so as to make the sector/carrier's FFER target dynamically responsive to $E_c/I_{or}$ on the sector/carrier. Thus, method 300 may be carried out once every 10 seconds, 30 seconds, minute, or any other suitable time interval, on substantially a continuous basis. As such, starting with the second such time interval, the first FFER target of step 302 would be equal to the second FFER target of the previous time interval, and operation would continue iteratively from there.

And for a given time interval, step 304 may involve calculating $E_c/I_{or}$ at the end of the time interval. In other embodiments, step 304 may involve calculating $I_c/I_{or}$ approximately halfway through the time interval. And in still other embodiments, step 304 may involve calculating an average of multiple $E_c/I_{or}$ values calculated during the time interval. And other possibilities exist as well.

b. A Second Exemplary Method

Figure 4:
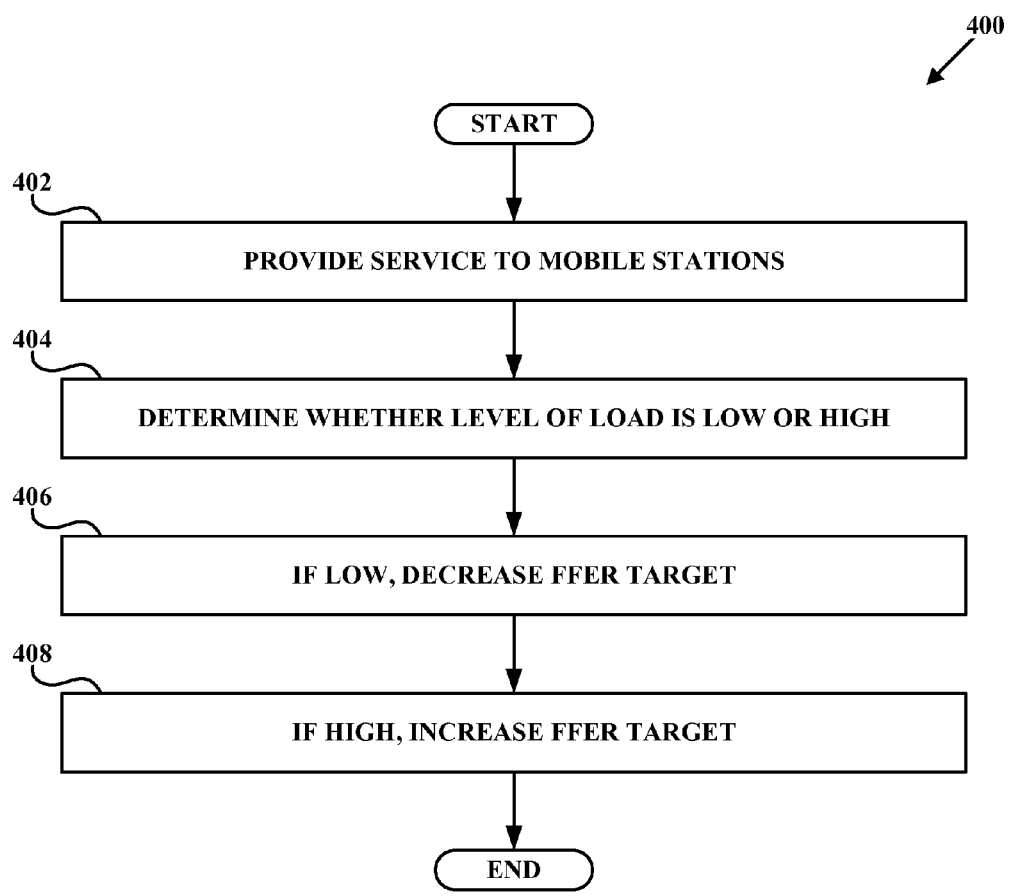
FIG. 4 is a flowchart of a method, in accordance with exemplary embodiments.

FIG. 4 is a flowchart of an exemplary method, in accordance with an exemplary embodiment. As with method 300 of FIG. 3, method 400 of FIG. 4 is described as being carried out by a BTS, and by BTS 104 in particular, though this is not required. Method 400 could be carried out by any one or any combination of the entities described as possibilities for carrying out method 300, and/or any other entity or entities. And method 400 is similar to method 300, and thus is not described in as great of detail.

As shown in FIG. 4, method 400 begins at step 402, when BTS 104 provides service to one or more mobile stations on a carrier in a wireless coverage area. At step 404, BTS 104 determines whether the current level of load on the carrier is low or high. At step 406, if the current level of load is low, BTS 104 decreases the FFER target for the carrier. At step 408, if the current level of load is high, BTS 104 increases the FFER target for the carrier.

Note that, in step 404, the determination as to whether the current level of load is low or high may involve consideration of any one or any combination of sector/carrier-load metrics. One such metric is $E_c/I_{or}$, as discussed herein. Another metric could be Walsh-code occupancy, which may be computed as a ratio of (i) the number of Walsh codes currently assigned to mobile stations for traffic channels and (ii) the total number of Walsh codes generally available for traffic channels on the sector/carrier. Another possible metric is paging-channel-timeslot occupancy, which would be a similar ratio, though specifically pertaining to the finite number of timeslots available each time BTS 104 transmits the paging channel, as is known in the relevant art. And any other load metric or combination of load metrics could be used as well.

4. Conclusion

Various exemplary embodiments have been described above. Those skilled in the art will understand, however, that changes and modifications may be made to those examples without departing from the scope of the claims.

What is claimed is:

1. A method of forward-link power control carried out once per time interval over a series of successive time intervals, comprising:
 a base station providing service during a current time interval to a plurality of mobile stations on a carrier in a wireless coverage area according to a first forward-link frame-error-rate (FFER) target,
 wherein providing service according the first FFER target comprises:
  (i) increasing forward-link power to any mobile station in the plurality of mobile stations having a most recently determined FFER that exceeds the first FFER target, and
  (ii) decreasing forward-link power to any mobile station in the plurality of mobile stations having a most recently determined FFER that is lower than the first FFER target;
 the base station calculating an $E_c/I_{or}$ value for the carrier in the wireless coverage area for the current time interval as a ratio of a pilot-channel power level ($E_c$) for the current time interval to an all-channel power level ($I_{or}$) for the current time interval;
 the base station automatically selecting a second FFER target for a next time interval based at least in part on the $E_c/I_{or}$ value calculated by the base station for the current time interval, the next time interval being successive to the current time interval; and
 the base station providing service during the next time interval to the plurality of mobile stations on the carrier in the wireless coverage area according to the second FFER target,
 wherein providing service according to the second FFER target comprises:

(i) increasing forward-link power to any mobile station in the plurality of mobile stations having a most recently determined FFER that exceeds the second FFER target, and
  (ii) decreasing forward-link power to any mobile station in the plurality of mobile stations having a most recently determined FFER that is lower than the second FFER target.

2. The method of claim 1, wherein the base station comprises at least one of a base transceiver station and a base station controller, and wherein the service comprises code division multiple access (CDMA) service.

3. The method of claim 1, wherein the wireless coverage area comprises at least one of a cell and a sector.

4. The method of claim 1, wherein the first FFER target is 2%, and wherein the second FFER target is 1%, 2%, or 3%.

5. The method of claim 1, wherein the ratio is a base-10 logarithmic ratio.

6. The method of claim 5, wherein the pilot-channel power value and the all-channel power value are each measured in Watts (W), and wherein $E_c/I_{or}$ is measured in decibels (dB).

7. The method of claim 1, wherein selecting the second FFER target based at least in part on the calculated $E_c/I_{or}$ value comprises:
 comparing the calculated $E_c/I_{or}$ value with a threshold $E_c/I_{or}$ value;
 if the calculated $E_c/I_{or}$ value is less than the threshold $E_c/I_{or}$ value, selecting the second FFER target to be greater than the first FFER target; and
 if the calculated $E_c/I_{or}$ value is greater than or equal to the threshold $E_c/I_{or}$ value, selecting the second FFER target to be less than the first FFER target.

8. The method of claim 7, wherein the threshold $E_c/I_{or}$ value is approximately equal to −6 dB.

9. The method of claim 1, wherein selecting the second FFER target based at least in part on the calculated $E_c/I_{or}$ value comprises:
 comparing the calculated $E_c/I_{or}$ value with both a lower threshold $E_c/I_{or}$ value and an upper threshold $E_c/I_{or}$ value, wherein the lower threshold $E_c/I_{or}$ value is less than the upper threshold $E_c/I_{or}$ value;
 if the calculated $E_c/I_{or}$ value is less than the lower threshold $E_c/I_{or}$ value, selecting the second FFER target to be greater than the first FFER target;
 if the calculated $E_c/I_{or}$ value is (i) greater than or equal to the lower threshold $E_c/I_{or}$ value and (ii) less than or equal to the upper threshold $E_c/I_{or}$ value, selecting the second FFER target to be equal to the first FFER target; and
 if the calculated $E_c/I_{or}$ value is greater than the upper threshold $E_c/I_{or}$ value, selecting the second FFER target to be less than the first FFER target.

10. The method of claim 9, wherein the lower threshold $E_c/I_{or}$ value is approximately equal to −7 dB, and wherein the upper threshold $E_c/I_{or}$ value is approximately equal to −5 dB.

11. The method of claim 1, wherein selecting the second FFER target based at least in part on the calculated $E_c/I_{or}$ value comprises:
 maintaining a plurality of $E_c/I_{or}$ ranges, each range associated with a respective FFER-target value; and
 determining that the calculated $E_c/I_{or}$ value falls within a particular one of the $E_c/I_{or}$ ranges, and responsively selecting the second FFER target to be equal to the FFER-target value associated with the particular $E_c/I_{or}$ range.

12. The method of claim 1, wherein, for each time interval starting with the second time interval, the first FFER target is the second FFER target from the previous time interval.

13. The method of claim 12, wherein each time interval lasts approximately 10 seconds, approximately 30 seconds, or approximately one minute.

14. The method of claim 12, wherein, during each time interval, calculating the $E_c/I_{or}$ value comprises at least one of calculating an $E_c/I_{or}$ value at the end of the time interval, calculating an $E_c/I_{or}$ value approximately halfway through the time interval, and calculating an average of multiple $E_c I_{or}$ values calculated during the time interval.

15. A base station comprising:
 a communication interface;
 a processor; and
 data storage comprising instructions executable by the processor to:
  provide service during a current time interval to a plurality of mobile stations on a carrier in a wireless coverage area according to a first forward-link frame-error-rate (FFER) target,
  wherein providing service according to the first FFER target comprises:
   (i) increasing forward-link power to any mobile station in the plurality of mobile stations having a most recently determined FFER that exceeds the first FFER target, and
   (ii) decreasing forward-link power to any mobile station in the plurality of mobile stations having a most recently determined FFER that is less than the first FFER target;
  calculate an $E_c/I_{or}$ value for the carrier in the wireless coverage area for the current time interval as a ratio of a pilot-channel power level ($E_c$) for the current time interval to an all-channel power level ($I_{or}$) for the current time interval;
  automatically select a second FFER target for a next time interval based at least in part on the $E_c/I_{or}$ value calculated by the base station for the current time interval, the next time interval being successive to the current time interval; and
  provide service during the next time interval to the plurality of mobile stations on the carrier in the wireless coverage area according to the second FFER target,
  wherein providing service according to the second FFER target comprises:
   (i) increasing forward-link power to any mobile station in the plurality of mobile stations having a most recently determined FFER that exceeds the second FFER target, and
   (ii) decreasing forward-link power to any mobile station in the plurality of mobile stations having a most recently determined FFER that is less than the second FFER target.

16. A method of forward-link power control carried out once per time interval over a series of successive time intervals, comprising:
 a base station providing service during a current time interval to a plurality of mobile stations on a carrier in a wireless coverage area according to a first forward-link frame-error-rate (FFER) target;
 determining whether a current level of load on the carrier is low or high;
 if the current level of load is low, the base station providing service during a next time interval to the plurality of mobile stations on the carrier in the wireless coverage area according to a second FFER target that is less than the first FFER target, the next time interval being successive to the current time interval; and
 if the current level of load is high, the base station providing service during the next time interval to the plurality of mobile stations on the carrier in the wireless coverage area according to a third FFER target that is greater than the first FFER target,
 wherein providing service to the plurality of mobile stations on the carrier in the wireless coverage area according to a given FFER target comprises:
  (i) increasing forward-link power to any mobile station in the plurality of mobile stations having a most recently determined FFER that exceeds the given FFER target, and
  (ii) decreasing forward-link power to any mobile station in the plurality of mobile stations having a most recently determined FFER that is less than the given FFER target.

17. The method of claim 16, wherein determining whether the current level of load on the carrier is low or high comprises determining whether the current level of load is low or high based on at least one of a ratio of a pilot-channel power level to an all-channel power level, Walsh-code occupancy, and paging-channel-timeslot occupancy.

* * * * *